United States Patent [19]
Cassen et al.

[11] Patent Number: 6,005,531
[45] Date of Patent: Dec. 21, 1999

[54] ANTENNA ASSEMBLY INCLUDING DUAL CHANNEL MICROWAVE TRANSMIT/ RECEIVE MODULES

[75] Inventors: John W. Cassen, Sykesville; Gary N. Bonadies, Laurel; Patrick K. Richard, Baltimore; David A. Herlihy, Ellicott City; Ayn U. Fuller, Greenbelt; Daniel H. Wenzlick, Linthicum; Richard C. Kapraun, Baltimore; Mark R. Schrote, Ellicott City; Kerry M. Yon, Beltsville; H. Halley Lisle, IV, Monrovia; Toby Hess, Olney; Edward L. Rich, III, Arnold; George T. Hall, Catonsville; Brian T. Drude, Arbutus, all of Md.

[73] Assignee: Northrop Grumman Corporation, Los Angeles, Calif.

[21] Appl. No.: 09/158,827

[22] Filed: Sep. 23, 1998

[51] Int. Cl.$^6$ .................................................. H01Q 21/00
[52] U.S. Cl. .................. 343/853; 343/754; 343/700 MS
[58] Field of Search ............................ 343/700 MS, 705, 343/754, 853

[56] References Cited

U.S. PATENT DOCUMENTS

| | | | |
|---|---|---|---|
| 3,818,386 | 6/1974 | Granberry | 333/33 |
| 4,806,937 | 2/1989 | Peil | 342/175 |
| 4,870,421 | 9/1989 | Peil et al. | 342/175 |
| 4,998,181 | 3/1991 | Haws et al. | 361/385 |
| 5,264,860 | 11/1993 | Quan | 343/767 |
| 5,276,455 | 1/1994 | Fitzsimmons et al. | 343/777 |
| 5,382,175 | 1/1995 | Kunkel | 439/327 |
| 5,404,148 | 4/1995 | Zwarts | 343/776 |
| 5,412,414 | 5/1995 | Ast et al. | 342/174 |
| 5,431,582 | 7/1995 | Carvalho et al. | 439/372 |
| 5,457,607 | 10/1995 | Carvalho | 361/740 |
| 5,539,415 | 7/1996 | Metzen et al. | 343/700 MS |
| 5,745,076 | 4/1998 | Turlington et al. | 342/372 |

*Primary Examiner*—Hoanganh Le
*Assistant Examiner*—Tan Ho

[57] ABSTRACT

An antenna assembly for an active electronically scanned array includes, among other things: an array of antenna elements; an RF signal feed and circulator assembly coupled to said antenna elements and forming thereby an array of radiating structures; a generally planar RF manifold assembly having regularly spaced openings therein located behind and normal to the radiating structures; an array of T/R modules connected to the array of radiating structures and having respective RF connector assemblies forming a portion of an RF interface at one end portion of each of the modules which project upwardly through said spaced openings in the RF manifold and wherein the respective connector assemblies thereof connect to at least one immediately adjacent circulator as well as to transmit and receive manifold portions of the RF manifold; each of the T/R modules further have a heat sink plate on the back side thereof which is positioned against one of a number of elongated liquid coolant circulating coldplates connected to a coolant distribution manifold encircling the array; a DC power and logic signal distribution manifold; and, a plurality of elongated DC/logic circuit board members connected to the DC power and logic signal distribution manifold and being respectively located adjacent and coextensive with a respective coldplate for supplying DC power and logic control signals to a DC/logic interface located at the other end portion of the respective modules.

28 Claims, 12 Drawing Sheets

ANTENNA ASSEMBLY INCLUDING DUAL CHANNEL MICROWAVE TRANSMIT/RECEIVE MODULES

CROSS REFERENCE TO RELATED APPLICATIONS

This application is related to U.S. Ser. No. 09/158,829 (Northrop Grumman Docket No. BD-98-012) entitled, "A Dual Channel Microwave Transmit/Receive Module For An Active Aperture Of A Radar System", filed in the names of John W. Cassen et al on Sep. 23, 1998; and U.S. Ser. No. 09/158,832 (Northrop Grumman Docket No. BD-98-112) entitled "Transmit/Receive Module Having Multiple Transmit/Receive Paths With Shared Circuitry", filed in the names of John W. Cassen et al on Sep. 23, 1998.

Both of these applications are assigned to the assignee of this invention and, moreover, are intended to be incorporated herein by reference.

BACKGROUND OF THE INVENTION

This invention relates generally to antenna assemblies for pulse radar systems and more particularly to an antenna assembly for an active electronically scanned array, also known as an active aperture.

In a typical active aperture for a pulsed radar system, a large number of transmit/receive (T/R) circuits are arranged in a predetermined configuration and connected to an array of forwardly located radiator elements which collectively transmit and receive a beam of RF pulses to and from a target. The beam is typically energized, shaped and directed in azimuth and in elevation under the control of a beam steering controller assembly which forms part of the system.

In a phased array, the radar system sequentially generates RF transmit pulses which are distributed by means of a transmit manifold and microwave power generating circuitry to the array antenna elements. Between transmitted pulses, the radar system receives and processes successive return signals from the same antenna elements. The return signals are then processed and collected through a receive manifold and then processed in the radar system receiver circuitry for target identification and/or display.

In the transmit mode, a microwave transmit circuit in the T/R circuit operates on each RF pulse which is generated and fed to the transmit manifold, and thereafter controls the amplitude and phase of the RF pulse coupled to the antenna elements via a circulator device, a device well known in the art. In the receive mode, a microwave receive circuit in the T/R circuit, operates on each radar return signal coupled from the antenna elements via the circulator to control its amplitude and phase and which is then applied to the receive manifold where the signals are collected from all of the T/R circuits and fed back to RF demodulator circuitry in the system. Accordingly, one transmit circuit and one receive circuit form one transmit/receive channel.

Although transmit and receive circuits embodying a single T/R channel are known to have been fabricated in both separate and common modular packages, in the above-referenced application Ser. No. 09/158,829, (BD-98-012) entitled, "A Dual Channel Microwave Transmit/Receive Module For An Active Aperture Of A Radar System", there is disclosed a dual channel T/R module wherein two discrete T/R signal channels are implemented side by side in a common modular package.

The subject invention is directed to an antenna assembly which can accommodate such a dual channel and other like shaped T/R modules.

SUMMARY

Accordingly, it is an object of the present invention to provide an improvement in radar antenna assemblies.

It is a further object of the invention to provide an improvement in antenna assemblies for electronically scanned antenna arrays, also referred to as active apertures, utilized in connection with phased array radars.

And it is yet another object of the invention to provide an antenna assembly for an active aperture which accommodates dual channel transmit/receive modules.

These and other objects are achieved by an antenna assembly for an active electronically scanned array, which includes, among other things: a plurality of antenna elements; a respective RF signal feed and circulator coupled to each of said antenna elements and forming thereby a radiator subassembly; a plurality of said radiator subassemblies arranged in an array; a composite RF manifold including a receive manifold portion and a transmit manifold portion mutually insulated from each other and having regularly spaced openings therein, located adjacent said radiator subassemblies; a plurality of T/R modules aligned with said radiator subassemblies and having respective RF connector means forming a portion of an RF interface at one end portion of each of said modules which project upwardly through said spaced openings of said RF manifold and wherein the respective connector means thereof connect to at least one immediately adjacent circulator as well as the transmit and receive manifold portions of said RF manifold; each of said T/R modules further having a heat sink plate on one side thereof, wherein said heat sink plate contacts and is held in place against a respective one of a plurality of elongated liquid coolant circulating coldplates which traverse selected ones of said T/R modules; a coolant distribution manifold connected to each of said coldplates; a DC power and logic signal distribution manifold; and a plurality of elongated DC/logic circuit board members connected to the DC power and logic signal distribution manifold and being respectively located adjacent and coextensive with said plurality of coldplates for supplying DC power and logic control signals to a DC/logic interface located at the other end portion of said modules.

Further scope of applicability of the present invention will become apparent from the detailed description provided hereinafter. It should be noted, however, that the detailed description and specific example, while disclosing the preferred embodiment of the invention, is given by way of illustration only. This is due to the fact that various changes, alterations and modifications coming within the spirit and scope of the invention will become apparent to those skilled in the art.

BRIEF DESCRIPTION OF THE DRAWINGS

The present invention will become more fully understood when considered in conjunction with the accompanying drawings, and wherein.

DETAILED DESCRIPTION OF THE INVENTION

Figure 1:
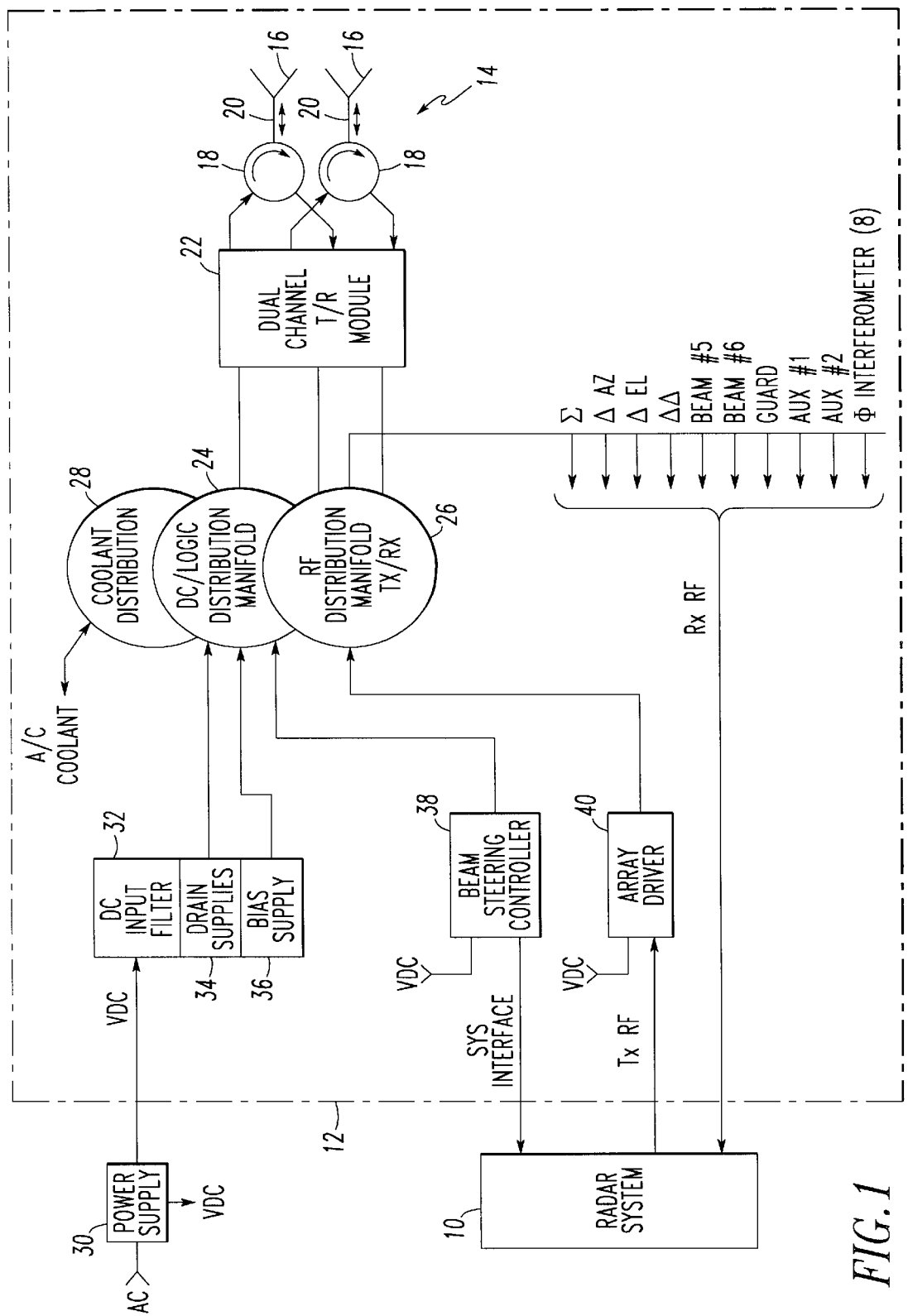
FIG. 1 is an electrical block diagram broadly illustrative of an antenna assembly in accordance with the subject invention.
Figure 2:
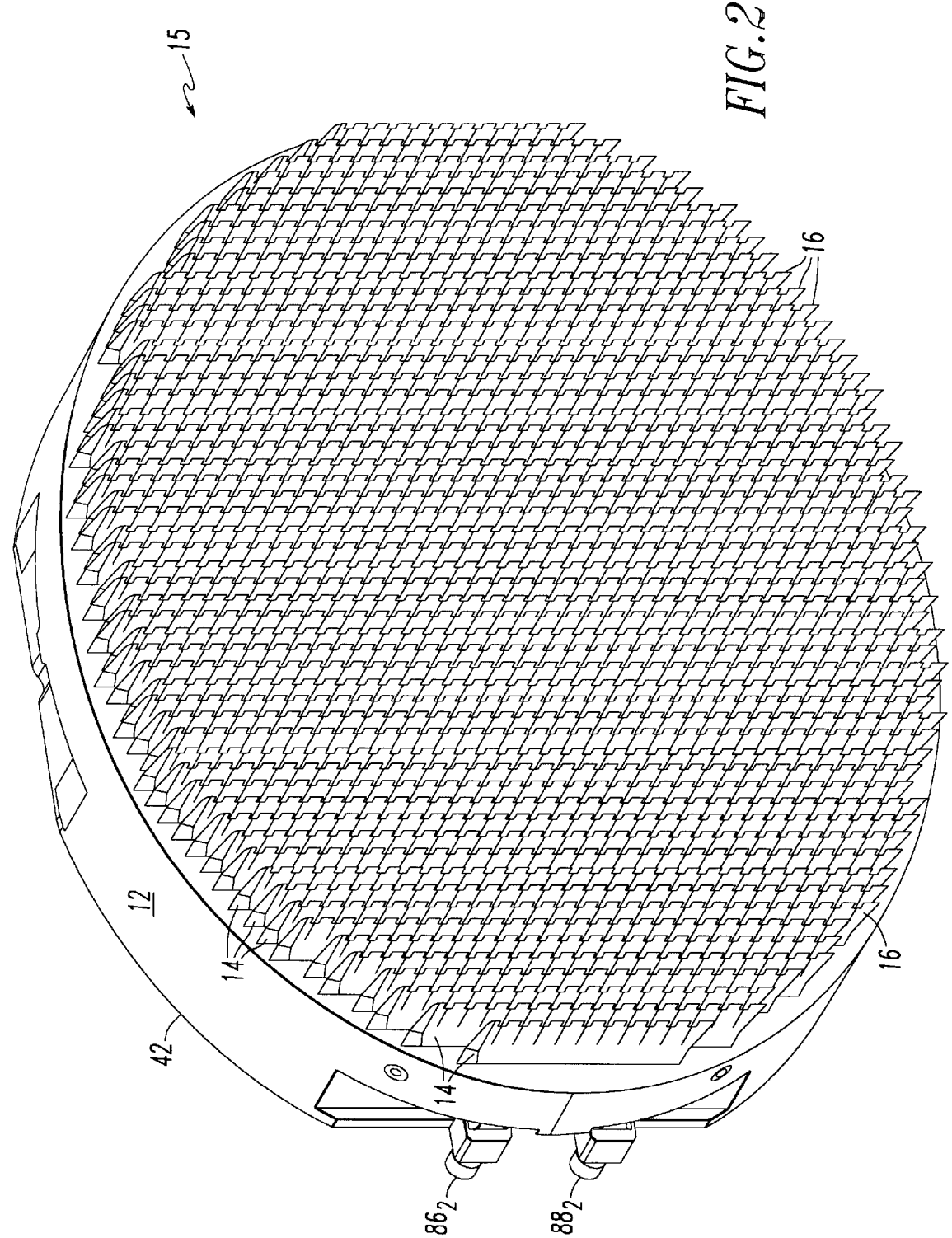
FIG. 2 is a perspective view illustrative of the radiator portion of the preferred embodiment of the invention.

Referring now to the drawing figures wherein like reference numerals refer to like elements throughout, shown in FIG. 1 is an electrical block diagram broadly illustrative of an active electronically scanned array, also referred to as an active aperture for a phased array radar system including the subject invention. Reference 10 denotes a radar system located behind an antenna assembly 12 embodying the subject invention and comprising, among other things, one of a plurality of vertically oriented radiator subassemblies 14 arranged in a parallel array 15 as shown in FIG. 2. Although not shown as such in FIG. 1, each radiator subassembly 14 actually includes a plurality of notched antenna elements 16, respective circulators 18 and antenna feeds 20 fabricated in an elongated planar structure as shown in FIG. 2.

Also depicted in FIG. 1 is one of a plurality of transmit/receive (T/R) modules 22 coupled to a common DC/logic distribution manifold 24 and a common RF distribution manifold 26. A liquid coolant manifold 28 forming part of a heat exchanger system for the T/R modules 22 is also shown.

Further as shown in FIG. 1, an external power supply 30 is coupled to a source of AC current, not shown, which rectifies AC power to DC. The DC is then filtered in a DC input filter 32 prior to being applied to a drain voltage power supply 34 and a bias voltage power supply 36. These supplies generate drain and bias voltages of a predetermined magnitude which are then fed to the DC/logic distribution manifold 24 along with beam steering signals generated by a radar beam steering controller 38.

Radar RF pulses generated for transmission by the active aperture are first generated in the radar system 10 and then fed to an array driver unit 40 prior to their being fed to the Transmit (Tx) portion of the RF distribution manifold 26 and the T/R modules 22. The radar return signals are received through the same aperture 14 used for transmission where they are coupled to the T/R modules 22 and then to the Receive (Rx) portion of the RF distribution manifold 26 where a plurality of received RF signals Σ, Δ AZ, Δ El, etc. are fed back the radar system 10 for processing and/or display.

Considering now the details of the antenna assembly 12, the various elements making up the assembly including the array 15 reside within a generally ovular housing 42 as shown in FIG. 2 and through which a generally ovular peripheral pattern of antenna subassemblies 14 including multiple antenna elements 16 extend. The ovular design for the housing 42 permits the radar assembly 12 to be mounted in the nose portion of an aircraft, not shown. However, this is not meant to be interpreted in a limiting sense, because, when desirable, other geometric patterns of antenna subassemblies 14 could be utilized. For example, one or more interconnected rectangular arrays 15 of antenna subassemblies 14 could be mounted on some other part, e.g. the underside of the aircraft depending on the radar's designated mission.

Figure 3:
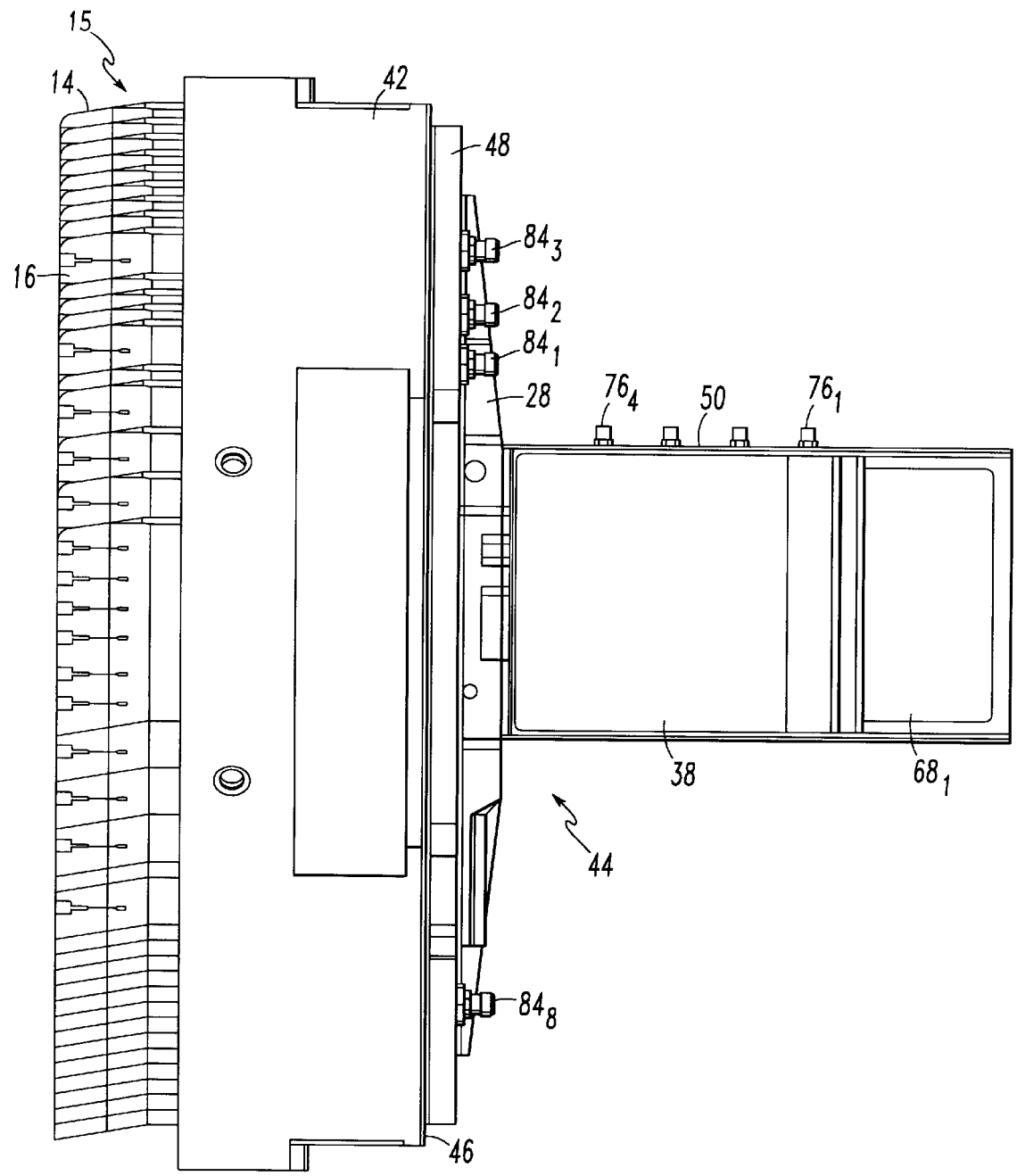
FIG. 3 is a side elevational view of the embodiment of the invention shown in FIG. 2.
Figure 4:
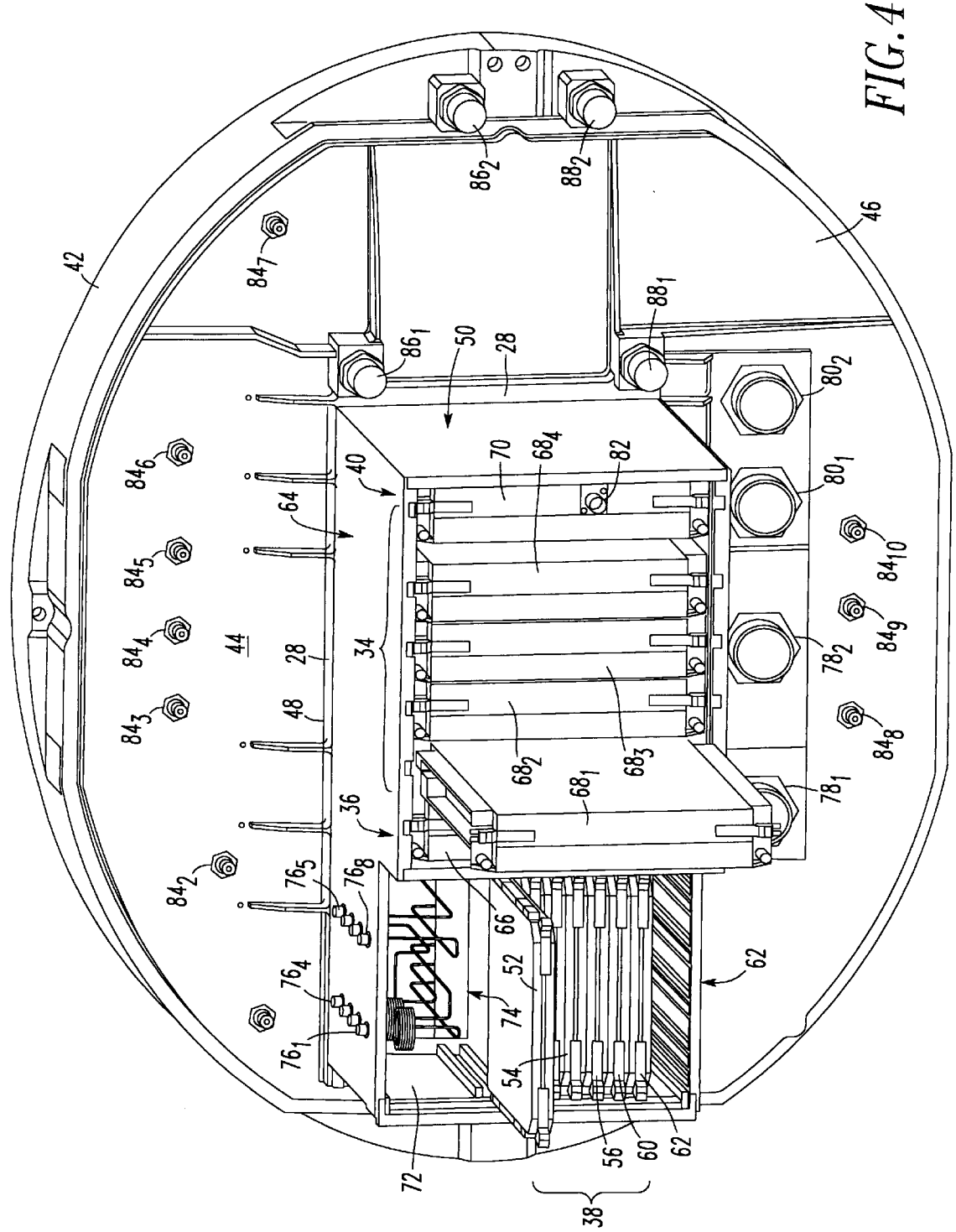
FIG. 4 is a perspective view of the backplane assembly of the embodiment of the invention shown in FIG. 2.

A backplane assembly 44 including a generally flat cover plate 46 is secured to the housing 42 as shown, for example, in FIGS. 3 and 4. The back cover plate 46 supports a mounting structure 48 for the liquid coolant manifold 28 and behind which is located a rearwardly projecting protective enclosure or housing 50 for a plurality of easily replaceable slide-in modules for implementing the drain voltage power supply 34, the bias voltage power supply 36, the beam steering controller 38 and the array driver 40 shown in the block diagram of FIG. 1.

Figure 5:
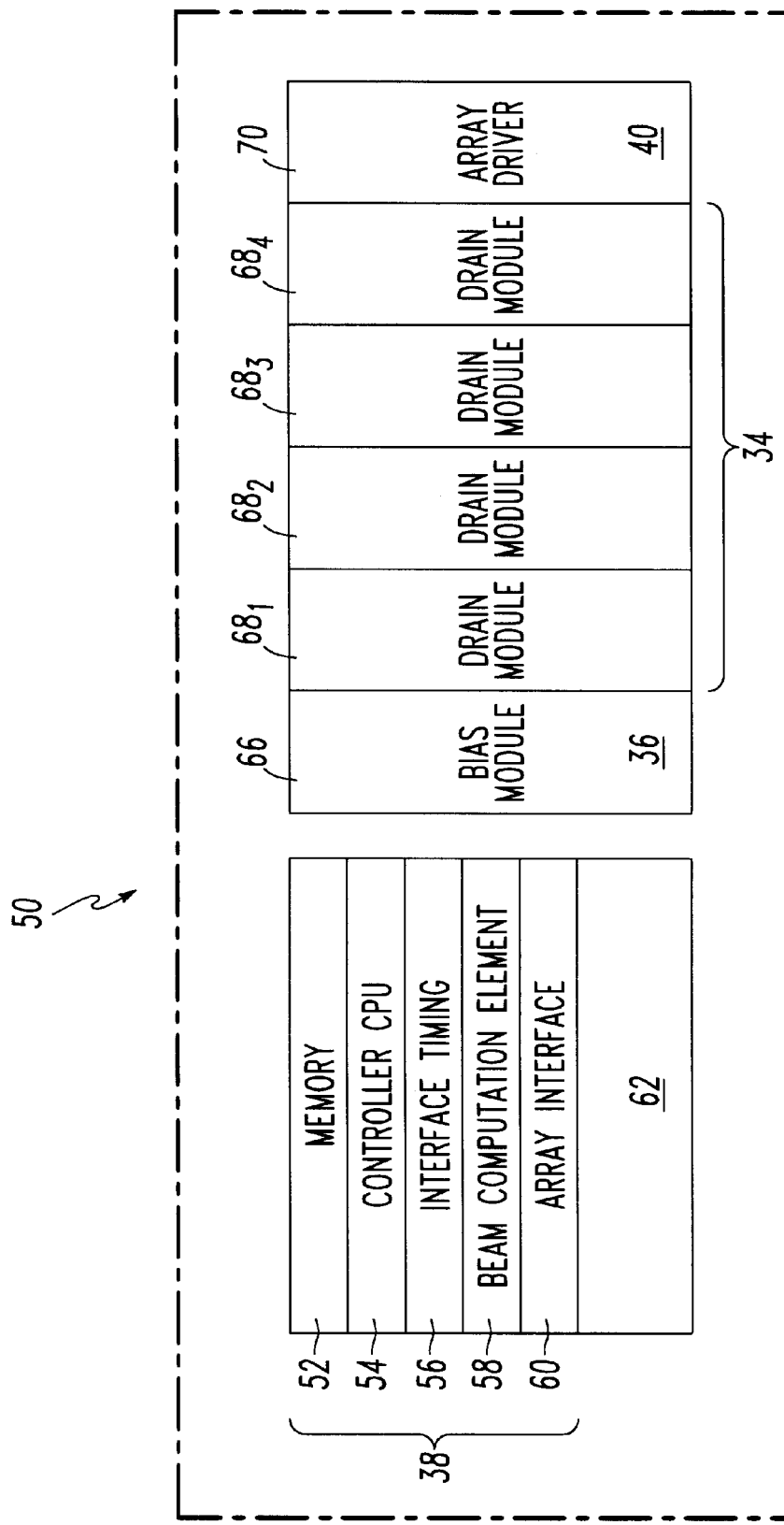
FIG. 5 is a block diagram illustrative of the components located in the backplane assembly shown in FIG. 4.

As further shown in the block diagram of FIG. 5, the beam steering controller 38 is comprised a memory module 52, a controller CPU module 54, an interface timing module 56, a beam computation module 58 and array interface module 60. These elements are housed in section 62 at the left side of the rear housing 50 as depicted in FIG. 4. Adjacent and to the right of the beam steering controller housing section 62 is a relatively larger housing section 64 for a single bias voltage supply module 66, four(4) drain voltage supply modules $68_1$, $68_2$, $68_3$ and $68_4$, and a single array driver power module 70. Mating connectors for these modules are located on underlying portion 71 of the cover plate 46 as illustrated in FIG. 6.

Located above the beam steering controller housing section 62 is a housing section 72 including apparatus for implementing an RF interferometer 74 and which includes eight output connectors $76_1$, $76_2$ ... $76_8$.

Figure 6:
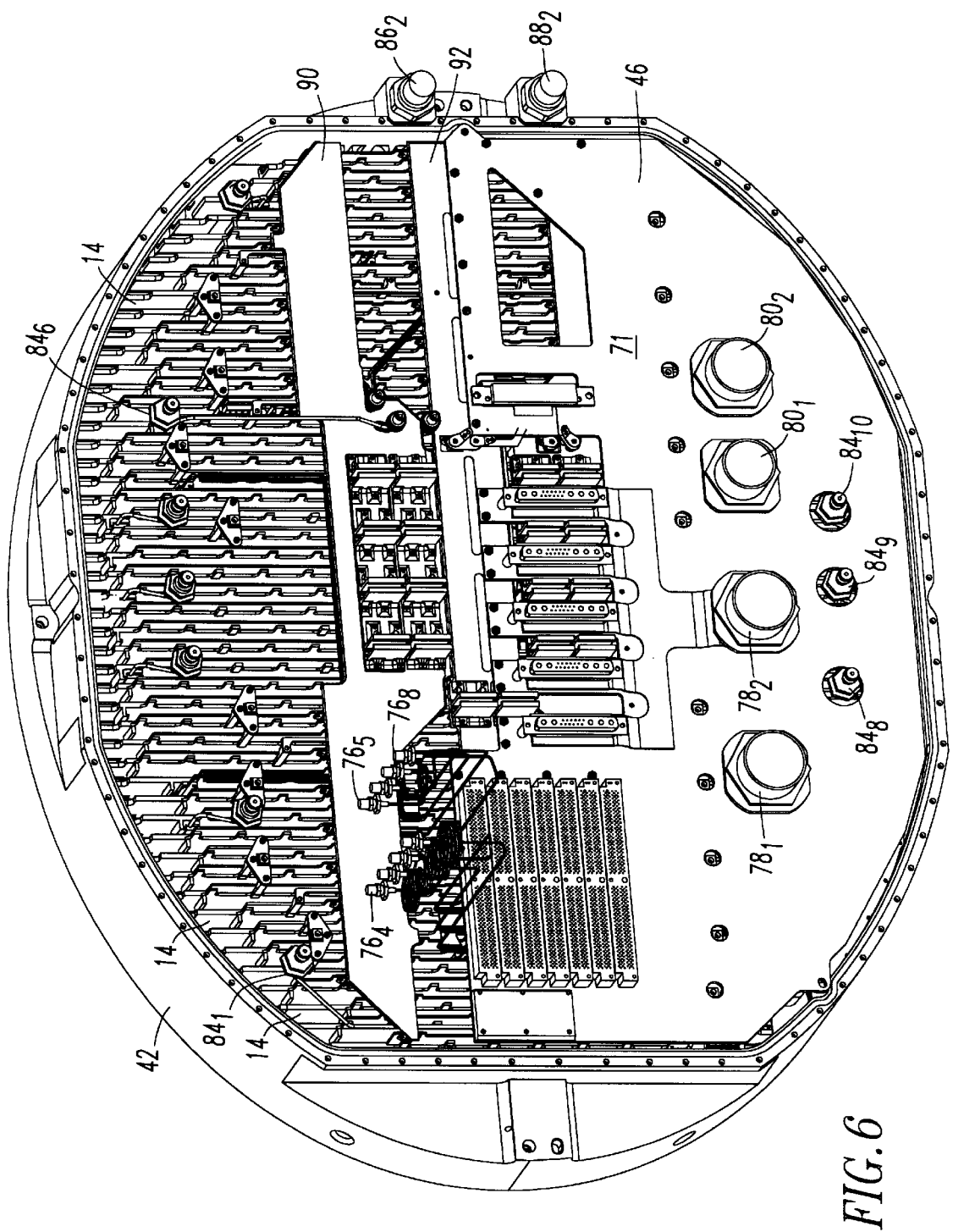
FIG. 6 is a perspective view illustrative of the interior portion of the backplane assembly shown in FIG. 4.

A pair of relatively large DC power input connectors $78_1$ and $78_2$ and a pair of logic control signal input connectors $80_1$ and $80_2$ are located beneath the power supply housing section 64 as shown in FIGS. 4 and 6. A single transmit RF input connector 82 (FIG. 4) for receiving an RF pulse generated by the radar system 10 (FIG. 1) is also located at the rear of the array drive module 70. A plurality of receive RF output connectors $84_1$, $84_2$, ... $84_{10}$ are selectively disbursed around the outer portion of the backplane assembly 44 for outputting the Σ, ΔAZ, ΔE1 ... signals back to the radar system 10. To the right side of the housing 50 are a pair of liquid coolant inlets $86_1$ and $86_2$ and a pair of coolant outlets $88_1$ and $88_2$ which couple liquid coolant to and from the coolant distribution manifold 28.

Figure 7:
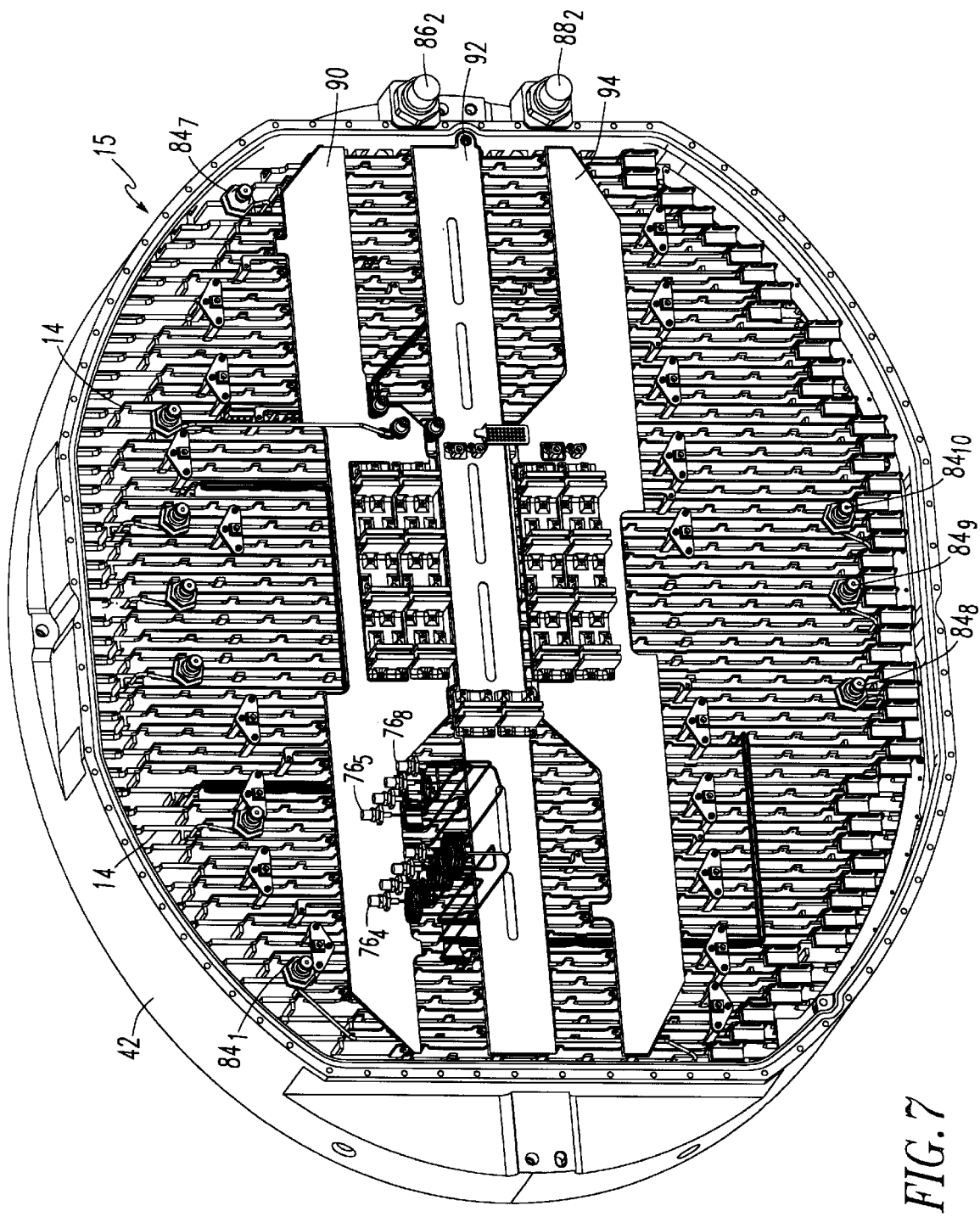
FIG. 7 is a perspective view illustrative of a bus bar assembly located in the interior of the antenna assembly.

Directly behind the cover plate 46 shown in FIG. 6 are three generally flat bus bar members 90, 92 and 93 which span the array 15 of radiator subassemblies 14. This is shown in FIG. 7. The upper and lower bus bar members 90 and 94 are used for delivering drain voltage to the T/R modules 22 from the drain power supply modules $68_1$, ... $68_4$ while the middle bus bar member 92 is used for delivering the bias voltage to the T/R modules from the bias power supply module 36.

Figure 8:
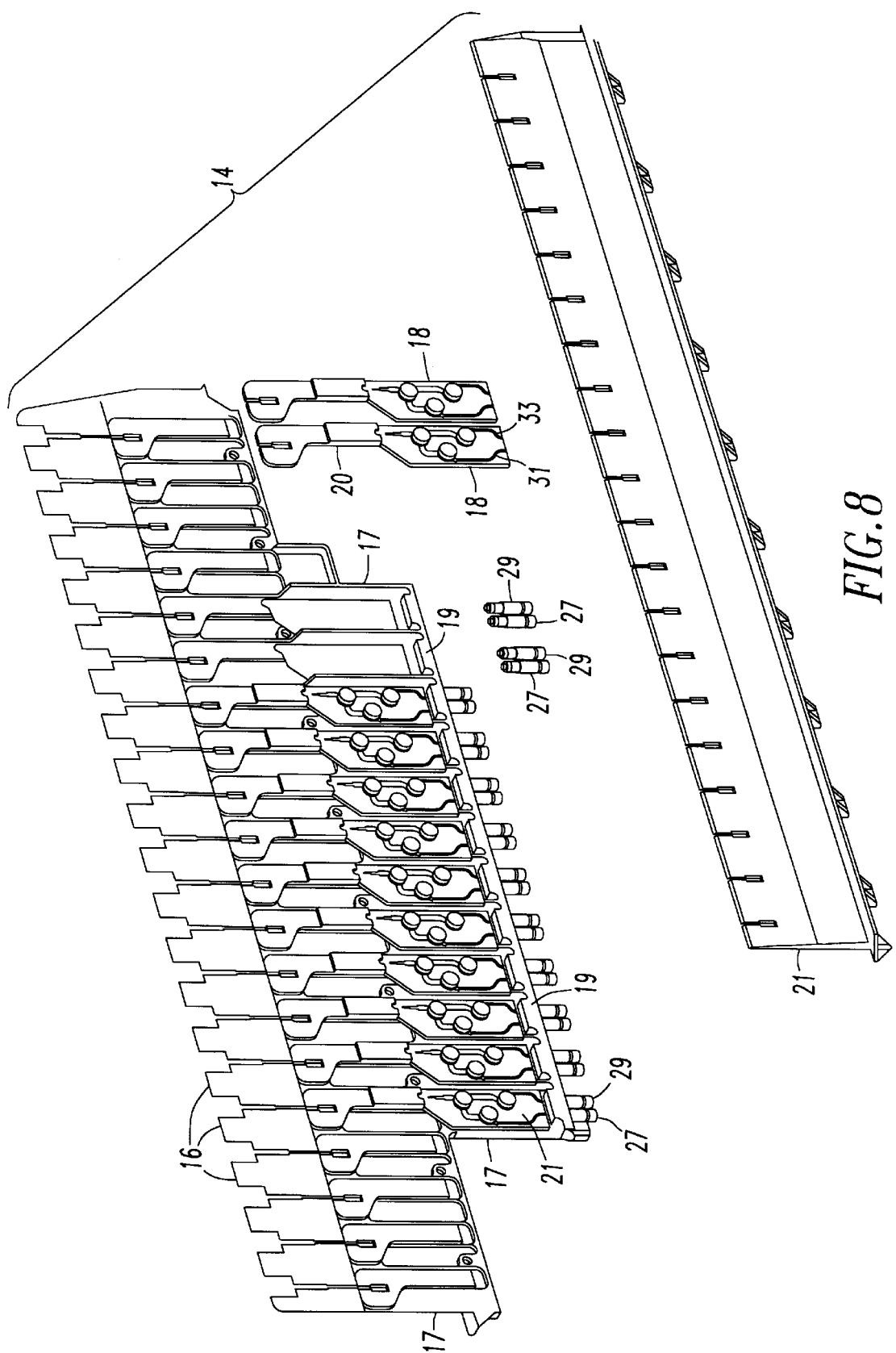
FIG. 8 is a partial perspective view of a radiator subassembly in accordance with the subject invention.
Figure 9:
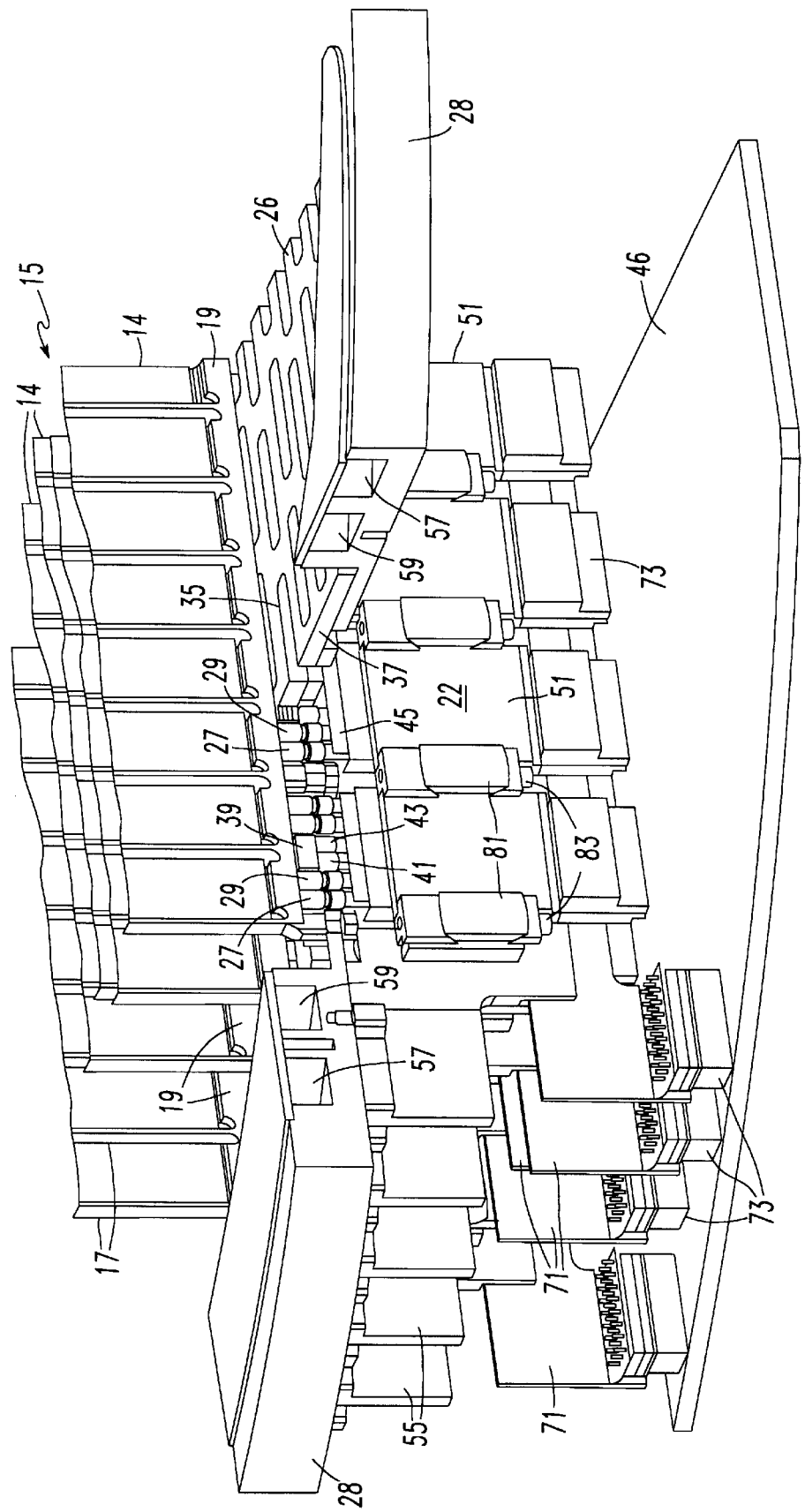
FIG. 9 is a partial perspective view further illustrative of a radiator subassembly shown in FIG. 8 and a row of T/R modules connected thereto.
Figure 10:
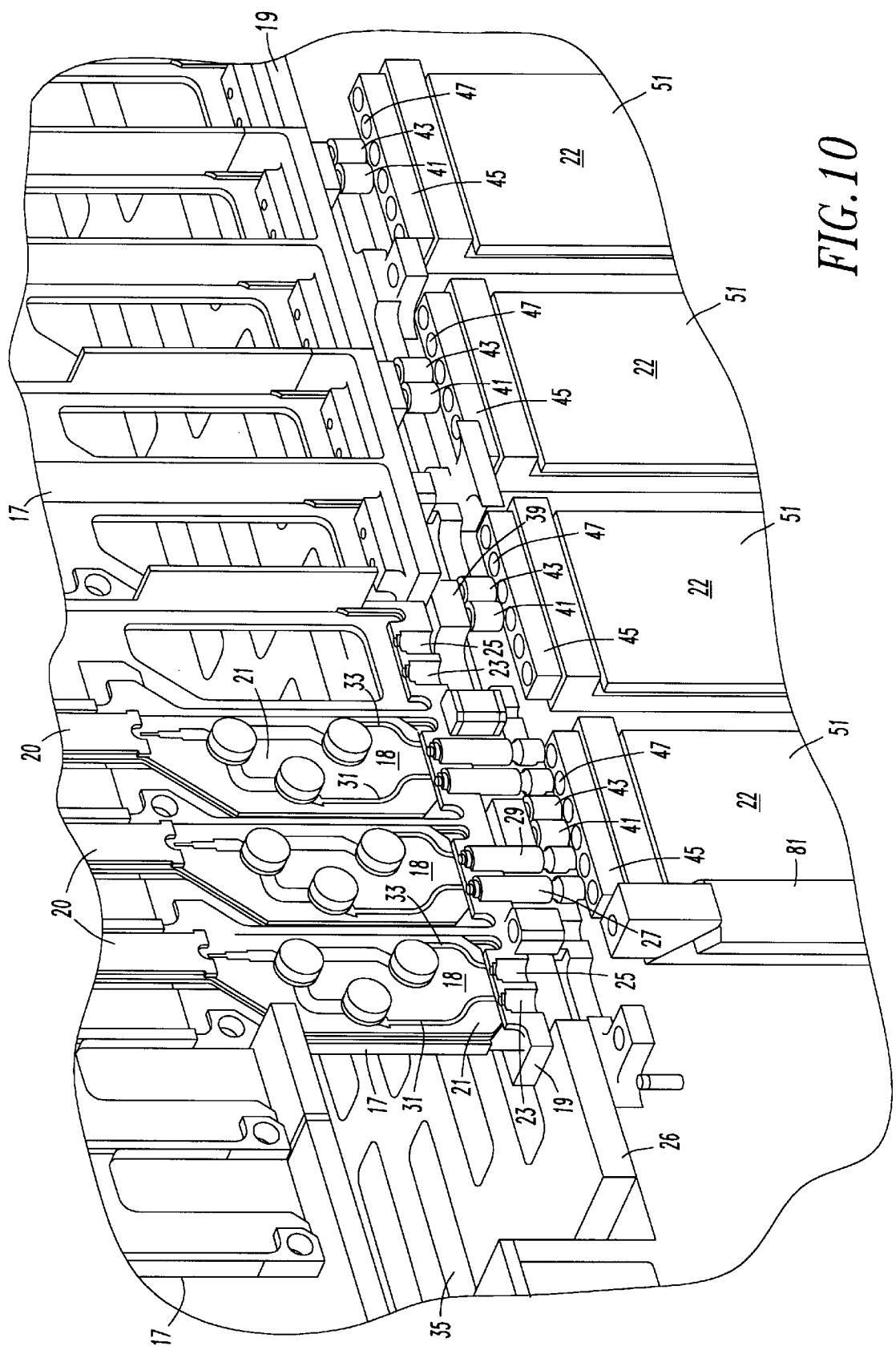
FIG. 10 is a perspective view further illustrative of elements shown in FIG. 8.

Turning attention now to FIGS. 8, 9 and 10, as noted above, the antenna assembly 12 includes an array 15 of radiator subassemblies 14. As shown in FIG. 8, each radiator subassembly 14 includes a row of coplanar notched transmit/receive antenna elements 16 formed on a frame member 17 having a lower base portion 19. Each notched antenna element 16 terminates rearwardly adjacent a stripline line type of microwave RF feed element 20 which is connected at its inner end to a respective circulator 18 and which are protected by an elongated cover member 21. Each circulator 18 operates to couple RF energy output from a T/R module 22 as shown in FIGS. 9 and 10 to a designated antenna element 16 and for subsequently coupling radar return RF energy back to the T/R module 22.

The circuitry implementing each of the circulators 18 is located on circuit board structures 21 which are attached to the frame 17. This is best illustrated in FIG. 10. The base portion 19 has multiple pairs of circular bores 23 and 25 therein which are adapted to receive and hold in place respective pairs of small tubular RF coupling members 27 and 29 for coupling RF energy between a T/R module 22 and stripline conductors 31 and 33 of a respective circulator 18 and which pass through an opening 35 of a plurality of regularly spaced openings 35 formed in the RF manifold 26.

As shown in FIG. 9, the RF manifold 26 is comprised of a plurality of contiguous RF strip line microwave conductor board members 37 as shown in FIG. 9 which are mutually insulated from one another and include RF coupler sections 39 which abut a pair of relatively shorter tubular coupler members 41 and 43 and which are also adapted to couple transmit (Tx) RF and receive (Rx) RF to and from a T/R module 22.

As can be seen from FIG. 9, adjacent pairs of coupler members 27 and 29 and intermediate RF manifold coupler members 41 and 43 are adapted to make a "press fit" connection with a multi-connector RF connector assembly 45 located at the end face of a T/R module 22. Accordingly, each connector 45 includes six RF connector ports 47 which straddle a pair of adjacent circulator assemblies 18 so as to have one pair of connector ports 47 coupled to one circulator 18 and a second pair of connector ports 47 connected to an immediately adjacent circulator 18 while an intermediate pair of connector ports 47 connect to the transmit (Tx) manifold section and receive (Rx) manifold section respectively of the RF manifold 26 so that one T/R module 22 operates in connection with two adjacent antenna elements 16.

Each T/R module 22 comprises a module wherein two discrete T/R signal channels are implemented side-by-side in a common package. The details of such a device is shown and described in the above cross referenced related application Ser. No. 09/158,829, (Docket No. BD-98-012) entitled "A Dual Channel Microwave Transmit/Receive Module for an Active Aperture of a Radar System" in which is incorporated herein by reference.

Figure 11:
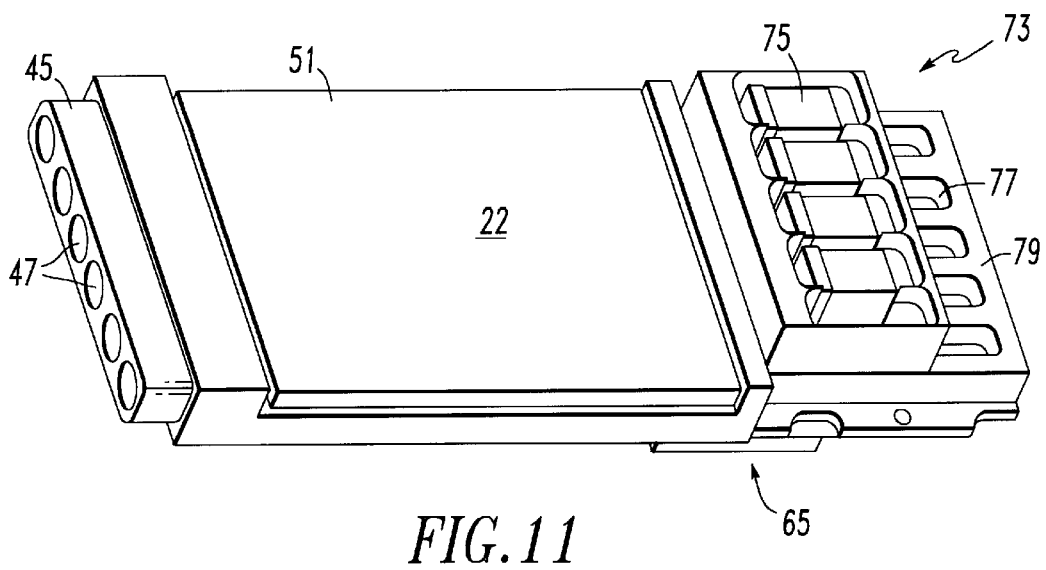
FIG. 11 is a perspective view illustrative of one of the T/R modules shown in FIGS. 9 and 10.
Figure 12A:
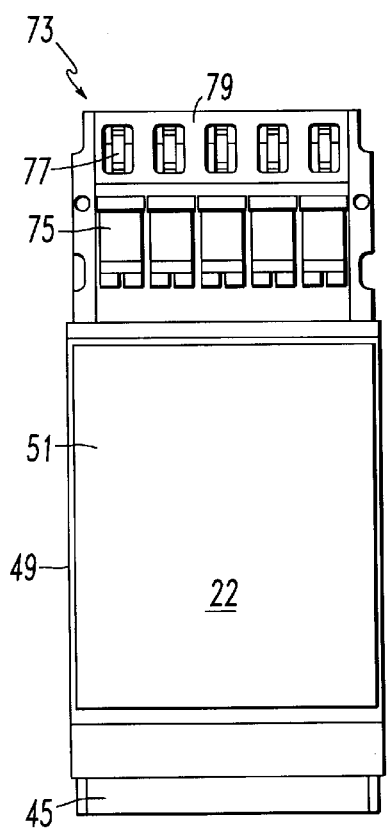
FIGS. 12A–12C comprise top elevation, side elevation and bottom elevation views, respectively, of the T/R module shown in FIG. 11.
Figure 12B:
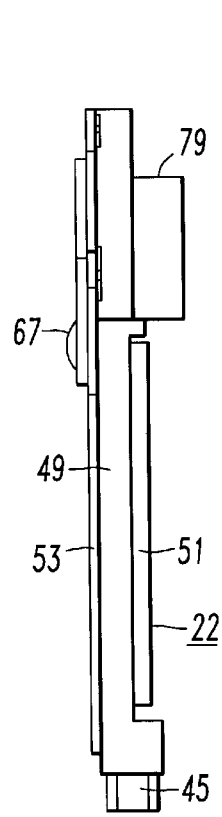
Figure 12C:
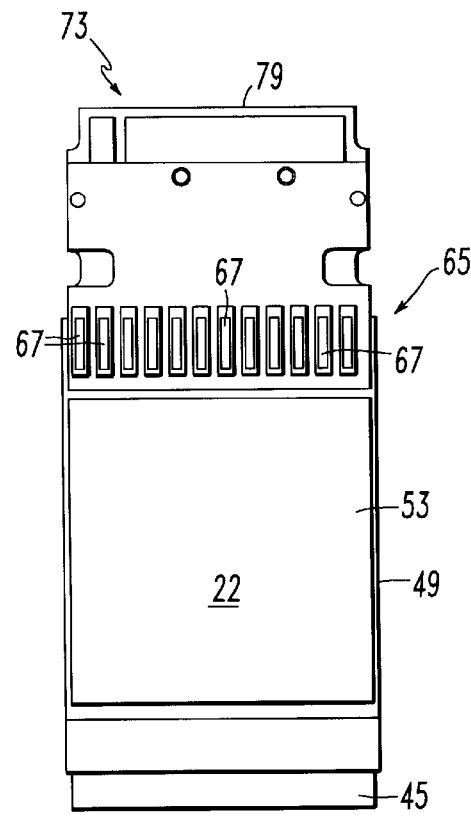

Referring now to FIGS. 11 and 12A–12C, each T/R module 22 is comprised of a multi-layer substrate 49 comprised of a plurality of high temperature co-fired ceramic (HTCC) layers bonded together so as to form a generally flat rectangular package and which acts as a means for housing the architecture of active and passive transmit/receive circuit components implementing a dual T/R function. Further, as shown in FIG. 11, a flat metallized rectangular cover 51 is fitted to the top of the substrate 49. On the bottom side, a flat rectangular heat sink plate 53 is bonded to the substrate 47 for acting as a thermal interface for transferring heat generated within the module to one of a plurality of parallel coldplates 55 (FIG. 9) which, in conjunction with the coolant distribution manifold 28, comprise a heat exchanger.

Figure 14:
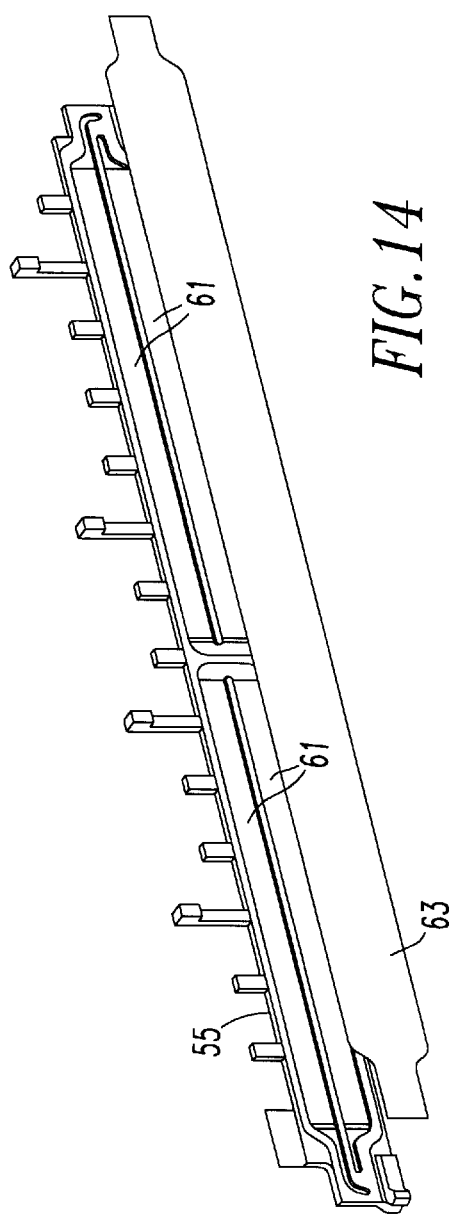
FIG. 14 is an exploded view further illustrative of the coldplate shown in FIG. 13.

The coolant manifold 28 as shown in FIG. 9 encircles the coldplates 55 and includes a pair of mutually parallel passages 57 and 59 of generally rectangular cross section for providing bi-directional coolant flow between and through the coldplates 55 which also include pairs of interior conduits 61 (FIG. 14) and a cover 63 therefor. Two bi-directional coolant flow paths to and from the middle of the coldplate 55 are thus provided so that an even heat transfer takes place from all of T/R modules 22 and modules in the middle of the array 15 do not become overheated relative to those on the end.

Figure 13:
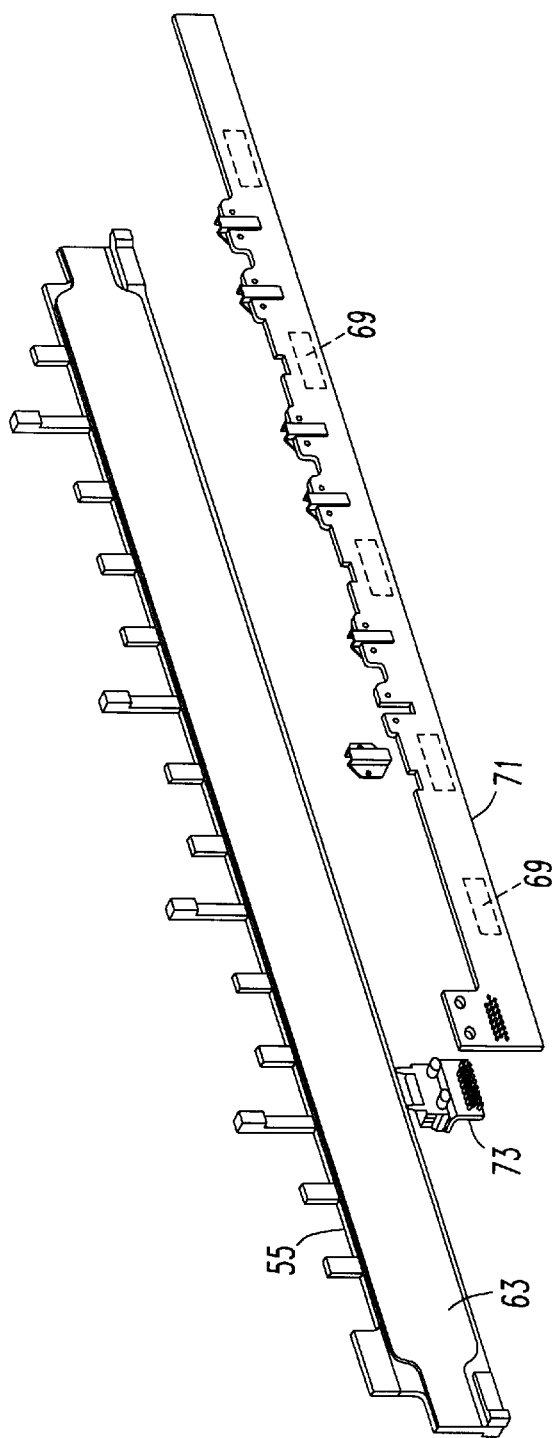
FIG. 13 is a further perspective view illustrative of a coldplate and a DC/logic circuit board associated with a row of T/R modules shown in FIGS. 9 and 10.

Whereas the connector assembly 45 at one end face of the T/R module 22 operates as a RF interface for all RF signals coupled to and from a T/R module 22, all other electrical connections thereto for supplying DC power and logic control signals are made through a DC/logic interface 65 located at the opposite end of the substrate 49 and on the bottom side thereof. The interface 65 includes a set of parallel spring finger contact elements 67 which span the width of the substrate 49 so as to contact a set of complementary contact set of contact pads 69 shown in FIG. 13 located on a DC/logic board 71

Additionally, each T/R module 22 includes a storage capacitor bank assembly 73 attached to the rear end of the substrate 49 above the DC/logic interface 65. The capacitor bank assembly 73 includes a plurality of electrical storage capacitors 75 and respective electrical fuses 77 which are contained in a housing 79 having substantially the same width dimension as the substrate 49. The electrical storage capacitors 75 are adapted to supply additional DC energy to the T/R module 22 as needed, for example, under peak power conditions.

Located partially behind each coldplate 55 is an elongated DC/logic board 71 which traverses each row of T/R modules 22. Each DC/logic board 71 comprises a circuit board including an arrangement of strip line conductors and sets of contact pads 69 which connect at one end to a vertical column connector 73 so as to couple DC power and logic control signals to the individual T/R modules 22 via opposing finger contacts 67 of the T/R module's DC/logic interface 65.

Accordingly, the T/R modules 22 are manually plugged on end into the rear end of the radiator subassemblies 14 and the RF manifold 26 during assembly. When in position, they are firmly locked into place against one of the coldplates 55 by pairs of wedgelock assembles 81 which grip the sides of each T/R module 22 and cause the heat sink plate 53 on the bottom of the module 22 to be pressed tightly against the respective coldplate 55 upon actuation of screw members 83 which form part of the wedgelock assemblies 81. Because of their relative position and orientation, the T/R modules 22 can easily be replaced when required simply by releasing the wedgelock assemblies 81 and manually removing the desired module, whereupon a replacement can be easily installed in its place.

Thus, what has been shown and described is an improved antenna assembly for an electronically scanned array which affords ease of construction while at the same time reducing weight and cost without sacrificing performance.

Having thus shown and described what is at present considered to be the preferred embodiment of the invention, it should be known that the same has been made by way of illustration and not limitation. Accordingly, all equivalents, within the spirit and scope of the invention as set forth in the foregoing specification and claimed in the set of claims appended hereto, are meant to be included.

We claim:

1. An antenna assembly for an active electronically scanned array, comprising:
    a plurality of antenna elements;
    a respective RF signal feed and circulator coupled to each of said antenna elements and forming thereby a radiator subassembly;
    a plurality of said radiator subassemblies arranged in an array;
    a composite RF manifold including a receive manifold portion and a transmit manifold portion mutually insulated from each other and having regularly spaced openings therein, located adjacent said radiator subassemblies;
    a plurality of T/R modules aligned with said radiator subassemblies and having respective RF connector means forming a portion of an RF interface at one end portion of each of said modules which project upwardly through said spaced openings of said RF manifold and wherein the respective connector means thereof connect to at least one immediately adjacent circulator as well as the transmit and receive manifold portions of said RF manifold;

each of said T/R modules further having a heat sink plate on one side thereof, and wherein said heat sink plate is thermally coupled to and is held in place against a respective one of a plurality of elongated liquid coolant circulating coldplates which traverse selected ones of said T/R modules;

a coolant distribution manifold connected to each of said coldplates;

a DC power and logic signal distribution manifold; and a plurality of elongated DC/logic circuit board members connected to the DC power and logic signal distribution manifold and being respectively located adjacent and coextensive with said plurality of coldplates for supplying DC power and logic control signals to a DC/logic interface located at the other end portion of said modules.

2. An antenna assembly according to claim 1 wherein said array comprises a plural array.

3. An antenna assembly according to claim 2 wherein said array comprises a plurality of parallel rows of radiator assemblies.

4. An antenna assembly according to claim 1 wherein said array includes a predetermined geometrical peripheral pattern of radiator subassemblies.

5. An antenna assembly according to claim 4 wherein said array is supported by a housing.

6. An antenna assembly according to claim 5 wherein said housing is configured so as to be mounted on an aircraft.

7. An antenna according to claim 6 wherein said housing is configured for mounting in a front or nose portion of the aircraft.

8. An antenna according to claim 7 wherein said housing and said peripheral pattern is generally ovular.

9. An antenna assembly according to claim 1 and additionally including means for holding said T/R modules in place against the respective coldplates.

10. An antenna assembly according to claim 9 wherein said means for holding said T/R modules in place comprises pairs of wedgelock devices located at the sides of said T/R modules.

11. An antenna assembly according to claim 1 wherein said T/R modules include an elongated package having a relatively thin profile of generally rectangular cross section at least at said one end portion including said connector means and where the T/R modules are substantially aligned lengthwise with said radiator subassemblies.

12. An antenna assembly according to claim 11 wherein each of said T/R modules includes a supplemental source of DC power connected to said DC/logic interface.

13. An antenna assembly according to claim 12 wherein said supplemental source of DC power comprises at least one storage capacitor.

14. An antenna assembly according to claim 11 wherein said supplemental source of DC power comprises a bank of storage capacitors.

15. An antenna assembly according to claim 14 and additionally including means attached at said DC/logic interface for holding said bank of storage capacitors.

16. An antenna assembly according to claim 11 wherein each of said DC/logic distribution board members includes a respective set of connector pads located adjacent the DC/logic interface of each T/R module for making contact with a complementary set of electrical contacts located on said modules at said DC/logic interface.

17. An antenna assembly according to claim 11 wherein said T/R modules comprise dual channel T/R modules.

18. An antenna assembly according to claim 17 wherein said connector means include a plurality of RF connectors which connect to pairs of immediately adjacent circulators.

19. An antenna assembly according to claim 1 and additionally including a generally flat bus bar assembly located behind said T/R modules for coupling power supply voltages to said T/R modules via said DC/logic interface.

20. An antenna assembly according to claim 19 wherein said bus bar assembly includes at least one bus bar for supplying a first DC supply voltage to said T/R modules and at least one other bus bar for supplying a second DC supply voltage to said T/R modules.

21. An antenna assembly according to claim 19 and additionally including a backplane assembly including a back cover plate attached to a housing behind said bus bar assembly.

22. An antenna assembly according to claim 21 wherein said backplane assembly includes a beam steering controller assembly for generating and applying radar beam steering signals to said DC/logic interface.

23. An antenna assembly according to claim 22 and additionally including connector means mounted on said back cover plate for inputting logic signals to said beam steering controller assembly.

24. An antenna assembly according to claim 21 wherein said backplane assembly includes a DC power supply assembly for generating and supplying DC power to said DC/logic interface.

25. An antenna assembly according to claim 24 and additionally including connector means mounted on said back cover plate for inputting DC to said DC power supply assembly.

26. An antenna assembly according to claim 21 wherein said backplane assembly includes an array driver assembly for applying RF signals to be transmitted to said RF interface of the T/R modules.

27. An antenna assembly according to claim 21 wherein said backplane assembly includes a plurality of RF output connectors for coupling a plurality of receive RF signals from said receiver manifold portion of the RF manifold out of the antenna assembly.

28. An antenna assembly according to claim 21 wherein said backplane assembly includes coolant inlet means and coolant outlet means for feeding coldplate coolant to and from the coolant distribution manifold.

* * * * *